United States Patent [19]

Artieri

[11] Patent Number: 5,579,052
[45] Date of Patent: Nov. 26, 1996

[54] PICTURE PROCESSING SYSTEM

[75] Inventor: Alain Artieri, Meylan, France

[73] Assignee: SGS-Thomson Microelectronics S.A., Saint Genis Pouilly, France

[21] Appl. No.: 247,996

[22] Filed: May 24, 1994

[30]  Foreign Application Priority Data

May 27, 1993 [FR] France .................................. 93 06612
Oct. 29, 1993 [FR] France .................................. 93 13293

[51] Int. Cl.$^6$ .............................. H04N 7/30; H04N 7/32
[52] U.S. Cl. ........................................................ 348/416
[58] Field of Search ...................................... 348/416, 699; 382/56, 43; 375/245, 246, 253; H04N 7/30, 7/32

[56]  References Cited

U.S. PATENT DOCUMENTS

| | | | |
|---|---|---|---|
| 4,800,441 | 1/1989 | Fumitaka Sato | 358/261.1 |
| 5,253,078 | 10/1993 | Balkanski et al. | 348/416 |
| 5,379,356 | 1/1995 | Purcell et al. | 382/56 |

FOREIGN PATENT DOCUMENTS 3545106  6/1987  Germany ........................ G06F 15/68

OTHER PUBLICATIONS

Digital Image Processing Applications, Los Angeles, CA, Jan. 17–20, 1989, 140–147, Yusheng. T. Tsai, "Real–time architecture for error–tolerant color picture compression–."IEEE Colloquim on Parallel Architectures for Image Processing Applications, Digest No. 086, London, UK, Apr. 22, 1991, M. N. Chong, et al., "Pipeline Functional Algorithms, Data Partitioning for Adaptive Transform Coding Algorithms.""A One Chip VLSI for Real Time Two–Dimensional Discrete Losine", Circuits & Systems, 1988 IEEE Internal Sypos, Artieri et al, pp. 701–704.

"A Realtime Image Processing Chip Set", Solid State Circuits, 1989 36th Conference, IEEE.

"Designing a High–Throughput VLC Decoder Parts I–II––Parallel Decoding Methods", Lin et al, IEEE Trans. in Circuits & Systems for Video technology, vol. 2, No. 2, Jun. 1992, pp. 187–206.

*Primary Examiner*—Tommy P. Chin
*Assistant Examiner*—Vu Le
*Attorney, Agent, or Firm*—David M. Driscoll; James H. Morris; Brett N. Dorny

[57]  ABSTRACT

A system that processes compressed data arriving in packets corresponding to picture blocks, the packets being separated by headers containing decoding parameters of the packets. A memory bus is controlled by a memory controller to exchange data between the processing elements and a picture memory. A pipeline circuit contains a plurality of processing elements. A parameter bus provides packets to be processed to the pipeline circuit, as well as the decoding parameters to elements of the system. The parameter bus is controlled by a variable length decoder that receives the compressed data from the memory bus and that extracts the packets and the decoding parameters therefrom.

13 Claims, 7 Drawing Sheets

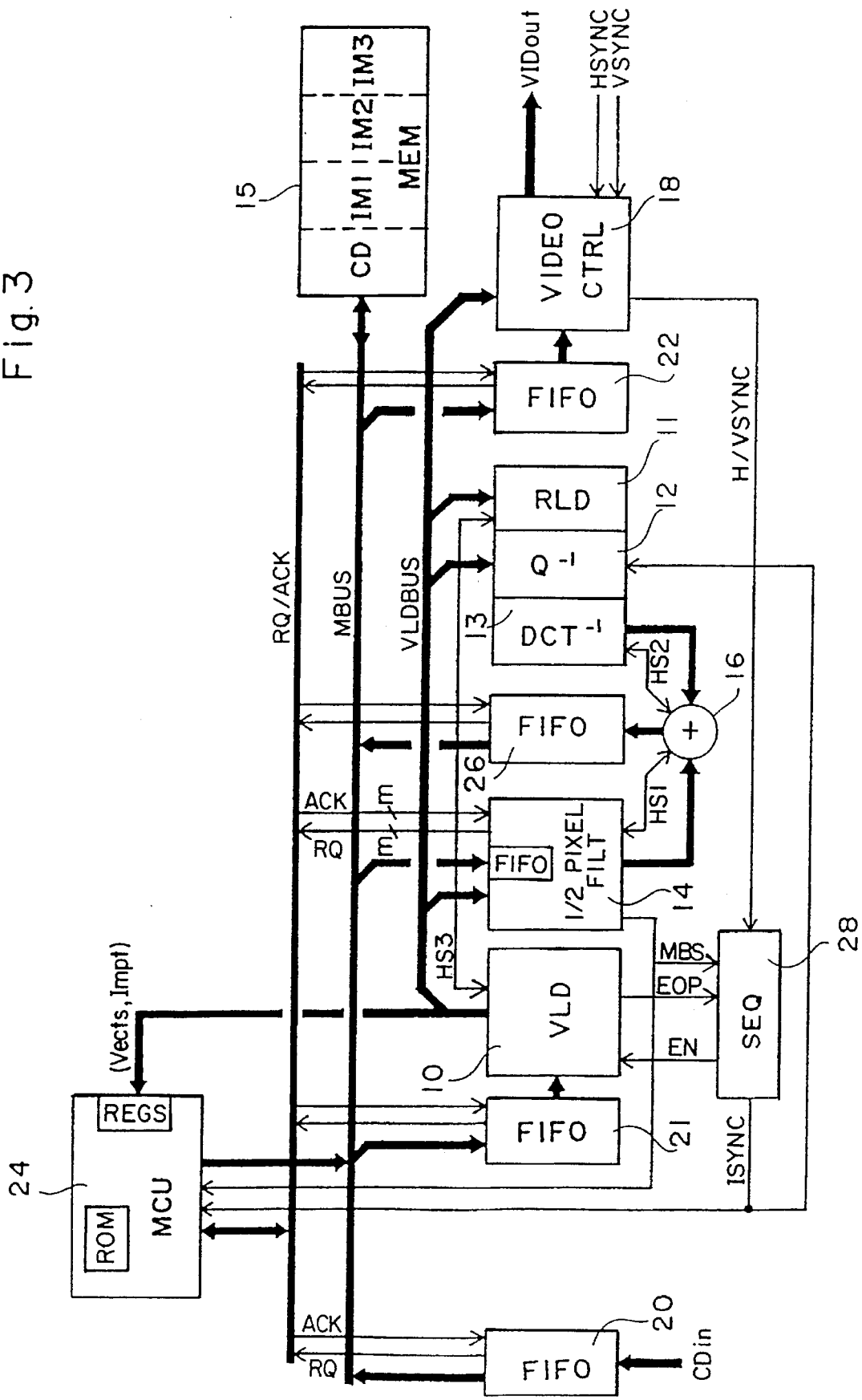

PICTURE PROCESSING SYSTEM

BACKGROUND OF THE INVENTION

1. Field of the Invention

The present invention relates to picture processing systems and more particularly to a system for decoding pictures encoded in accordance with an MPEG standard.

2. Discussion of the Related Art

FIG. 1 represents the main elements of an MPEG decoder 8. All MPEG decoders, especially for the MPEG-2 standard, generally include a variable length decoder (VLD) 10, a run-level decoder (RLD) 11, an inverse quantizer circuit ($Q^{-1}$) 12, an inverse discrete cosine transform circuit ($DCT^{-1}$) 13, a half-pixel filter 14, and a memory 15. The encoded data are provided to the decoder via a bus CDin and the decoded data are output via a bus VIDout. Between the input and the output, the data pass through processing circuits 10–13 in the order indicated above, which is illustrated by arrows in dashed lines. The decoder output is provided by an adder 16 that sums the outputs of filter 14 and of the cosine transform circuit 13. The filter 14 needs a portion of a previously decoded picture stored in memory 15.

FIG. 2A illustrates a decoding step of a portion of a currently reconstructed picture IM1. Picture decoding is carried out one macro-block at a time. A macro-block generally corresponds to one 16×16-pixel picture block.

FIG. 2B illustrates an exemplary format, noted 4:2:0, of a macro-block MB. The macro-block MB includes a luminance block formed by four 8×8-pixel blocks Y1–Y4 and by one chrominance block formed by two 8×8-pixel blocks U and V. An alternative format is the 4:2:2 format where the chrominance block includes two 8×16-pixel blocks.

In the current picture IM1 of FIG. 2A, a current macro-block MBc is being decoded, the macro-blocks that were previously decoded being represented by hatched lines. Generally, macro-block MBc is reconstructed by using a predictor macro-block MBp fetched in a previously decoded picture IM0. To find the predictor macro-block MBp, the data that serve to decode macro-block MBc provide a movement compensation vector V that defines the position of the predictor macro-block MBp with respect to the position P of macro-block MBc in the picture.

The predictor macro-block MBp is fetched in the memory 15 that stores the previously decoded picture IM0, and is provided to filter 14 while the cosine transform circuit 13 processes data corresponding to the macro-block MBc.

The decoding described above is a so-called "predicted" decoding. The decoded macro-block is also referred to as being of predicted type. In accordance with MPEG standards, there are three main types of decoding, referred to as "intra", "predicted", and "bidirectional".

An intra macro-block directly corresponds to a picture block, that is, the intra macro-block is not combined with a predictor macro-block when it is output from the cosine transform circuit 13.

A predictor macro-block, as described above, is combined with one macro-block of a previously decoded picture, and that comes, in the display order, before the currently reconstructed picture.

A bidirectional macro-block is combined with two predictor macro-blocks of two previously decoded pictures, respectively. These two pictures are respectively former (forward) and subsequent (backward) pictures, in the display order, with respect to the currently reconstructed picture. Thus, encoded pictures arrive in an order different from the display order.

In addition, each predicted or bidirectional macroblock is of a progressive or an interlaced type. When the macro-block is progressive, the $DCT^{-1}$ circuit provides the lines of the macro-block in successive order. When the macro-block is interlaced, the $DCT^{-1}$ circuit first provides the even lines of the macro-block, then the odd lines. In addition, the predictor macro-block that serves to decode a predicted or bidirectional macro-block is also of the progressive or interlaced-type. When the predictor macro-block is of the interlaced-type, it is partitioned into two half-macro-blocks; one half macro-block corresponds to even lines, and the other half macro-block corresponds to odd lines, each half macro-block being fetched at different positions in a same previously decoded picture.

A picture is also of the intra, predicted or bidirectional type. An intra picture contains only intra macro-blocks; a predicted picture contains intra or predicted macro-blocks; and a bidirectional picture contains intra, predicted or bidirectional macro-blocks.

To provide the various decoding parameters to the various circuits of the decoder, especially vectors V and the macro-block types, the flow of encoded data includes headers. There are several types of headers:

a picture sequence header that includes in particular two quantizer tables to provide to the inverse quantizer circuit 12, one serving for the intra macro-blocks of the sequence, and the second serving for the predicted or bidirectional macro-blocks;

a group of picture header, that does not include useful data for decoding;

a picture header that includes the type (predicted, intra, bidirectional) of the picture and information on the use of the movement compensation vectors;

a picture slice header including error correction information; and a macro-block header including the macro-block's type, a quantizer scale to be provided to the inverse quantizer circuit 12, and the components of the movement compensation vectors. Up to four vectors are provided when processing an interlaced bidirectional macro-block.

In addition, the high hierarchy headers (picture, group, sequence) can include private data serving, for example, for on-screen display. Some private data can also be used by components external to the decoder.

The various processing circuits of an MPEG decoder are frequently arranged in a pipeline architecture which can process high data flow rates but which is very complex and inflexible, that is, which is difficult to adapt to modifications of the standards and which is inadequate to exploit on-screen display and private data.

The simplest and most inexpensive solution is to couple the various processing circuits to the memory through a common bus that is controlled by a multi-task processor.

Patent application EP-A-0,503,956 (C-Cube) describes such a system including a processor that controls transfers of data on the bus and three coprocessors that execute the processing steps corresponding to circuits 10–14. Each type of transfer to be achieved via the bus corresponds to a task carried out by the processor. All tasks are concurrent and are executed at processor interrupts generated by the coprocessors. The coprocessors exchange the data to be processed and receive the instructions provided by the processor via the bus.

This system is simple, but it is incapable of handling the high data flow rates needed.

SUMMARY OF THE INVENTION

An object of the present invention is to provide a particularly fast picture decompression system with a relatively simple structure.

Another object of the invention is to provide such a decompression system that can be easily connected in parallel with identical decompression systems in order to process very high data flow rates.

To achieve these objects, the invention provides a decoder of composite architecture, that is, some of the processing elements are connected together and to a picture memory through a first bus, and some other elements are connected in a pipeline architecture. These other elements are referred to hereinafter as a "pipeline circuit". A second bus is provided to supply data to be processed to the first element of the pipeline circuit as well as the required decoding parameters to the elements of the system.

With this structure, the pipeline circuit processes data serially without it being necessary to exchange them with the memory through the first bus. In addition, the first bus is relieved of the transmission of decoding parameters, these parameters being transmitted by the second bus. Thus, the number of exchanges on the first bus corresponding to a given decoding step is substantially reduced, which increases the system's performance. The system has a high flexibility resulting from the use of a bus system. This flexibility is increased by an optimal choice of the elements to be included in the pipeline circuit.

The present invention more particularly addresses a system for processing compressed data arriving in packets corresponding to picture blocks, these packets being separated by headers containing decoding parameters of the packets. The system includes a plurality of processing elements using said decoding parameters, and a memory bus controlled by a memory controller to exchange data between the processing elements at rates adapted to the processing rates of these elements, and to store in a picture memory data to be processed or re-used. The system includes a pipeline circuit containing a plurality of processing elements connected to process packets serially, and a parameter bus to provide packets to be processed to the pipeline circuit, as well as the decoding parameters to elements of the system. The parameter bus is controlled by a master processing element that receives the compressed data from the memory bus and that extracts the packets and the decoding parameters therefrom.

According to an embodiment of the invention, each packet of compressed data is preceded by a block header, and the packets come in successive groups, each group of packets being preceded by a group header containing group decoding parameters as well as, possibly, private and on-screen display information. The system further includes a processor bus controlled by a microprocessor to supply the group decoding parameters and the private and on-screen display information to the system elements requiring them; a buffer memory accessible by the processor bus, receiving the compressed data through the memory bus; and a group header detector cooperating with this buffer memory to generate interrupts of the microprocessor.

According to an embodiment of the invention, a transfer of data between two elements connected to the memory bus corresponds to a specific task that is initiated or continued when one of the two elements issues a request to provide or to receive data, all the possible tasks being concurrent tasks that are carried out by the memory controller according to a task priority management.

According to an embodiment of the invention, the elements which exchange data with the picture memory are connected to the memory bus through respective write- or read-only buffer memories. A write-only buffer memory is emptied by the associated element and issues a request to receive data through the memory bus when its content reaches a lower limit. A read-only buffer memory is filled by the associated element and issues a request to provide data on the memory bus when its content reaches an upper limit.

According to an embodiment of the invention, the system includes a variable length decoder (VLD) forming the master processing element; a run-level decoder (RLD) forming a first element of the pipeline circuit and receiving through the parameter bus the packets processed by the VLD; an inverse quantizer circuit forming a second element of the pipeline circuit and receiving quantizer scale coefficients through the parameter bus; an inverse cosine transform circuit forming a third element of the pipeline circuit; the memory controller receiving movement compensation vectors through the parameter bus; a filter receiving block types through the parameter bus, this filter issuing distinct requests, according to the block types, to receive corresponding data provided on the memory bus as a function of the vectors received by the memory controller; and an adder to provide on the memory bus the sum of the outputs of the filter and of the cosine transform circuit.

According to an embodiment of the invention, the group header detector generates interruptions of the microprocessor when the associated buffer memory contains a picture sequence header or a picture header, the microprocessor being programmed to respond to these interruptions by reading, in the buffer memory associated with the group header detector, quantizer tables that the microprocessor provides to the inverse quantizer circuit, information on the picture type and on the amplitude of the movement compensation vectors that the microprocessor provides to the VLD, and information on the display configuration that the microprocessor provides to a display controller which receives the decoded data through the memory bus.

According to an embodiment of the invention, the memory controller includes an instruction memory (independent of the memory bus), in which are stored the program instructions corresponding respectively to transfer tasks on the memory bus; an instruction processing unit that is connected to the instruction memory in order to receive therefrom successive instructions to be executed, and that is connected to act on the memory bus in response to these instructions; a plurality of instruction pointers associated respectively to possible tasks and each including the current instruction address to be executed of the associated task, one only of these pointers is enabled at a time to provide its content as an instruction address to the instruction memory; a priority decoder assigning a predetermined priority level to each request and enabling the instruction pointer associated with the active request having the highest priority level; and means for incrementing the content of the enabled instruction pointer and for reinitializing it at the address of the associated program start when its content reaches the end address of the associated program.

According to an embodiment of the invention, each instruction includes a command field that is provided to the processing unit and a feature field provided to a prefix decoder that includes means for authorizing the enabling of a new instruction pointer by the priority decoder if the feature field of the current instruction is at a first predetermined value, and means for initializing the content of the enabled instruction pointer to the start address of the current program if the feature field of the current instruction is at a second predetermined value.

According to an embodiment of the invention, the prefix decoder includes means for inhibiting the incrementation of the enabled instruction pointer if the feature field is at a third predetermined value, so that the current instruction is executed consecutively several times, the number of executions being determined by this third value.

According to an embodiment of the invention, each instruction includes a command field that is provided to the instruction processing unit and an acknowledge field that is provided to means for, when the instruction is being executed, enabling at least one buffer memory connected to the memory bus.

According to an embodiment of the invention, the processing unit includes a plurality of hard wired functions for the calculation of addresses, each function being selected by a field of a read or write instruction that is being executed.

According to an embodiment of the invention, with each hard wired function is associated an address register connected to the memory bus; the hard wired function suitably modifies the content of its address register each time an instruction is executed in the processing unit.

The present invention also addresses a system for processing compressed data corresponding to pictures, including decoding means that provide decoded picture data to a picture memory, these means requiring, for decoding a current block of a picture being reconstructed, a predictor block of a previously decoded picture. In fact, the processing system includes a plurality of decoders associated with respective picture memories, each storing a specific slice of corresponding blocks of a plurality of pictures, as well as at least one margin in which is liable to be a predictor block used for reconstructing a block of the specific slice.

According to an embodiment of the invention, each considered decoder includes means for storing in its picture memory, as a margin, a boundary area of at least one additional specific slice and for providing to at least one second decoder, as a margin, a boundary area of the specific slice associated with the considered decoder.

According to an embodiment of the invention, each considered decoder includes a first buffer memory receiving picture blocks from the specific slice; at least one second buffer memory receiving picture blocks from an adjacent area of another specific slice; a terminal processing circuit providing the blocks of the specific slice to the first buffer memory of the considered decoder and to the second buffer memory of another decoder; and a memory controller to read the blocks in the first buffer memory and to write them in the picture memory at addresses corresponding to the specific slice, and to read the blocks in the second buffer memory and to write them at addresses corresponding to a margin.

According to an embodiment of the invention, each second buffer memory is preceded by a barrier circuit in order to store in the second buffer memory only the data corresponding to the desired margin.

According to an embodiment of the invention, the pictures to be processed are high definition television pictures that are partitioned in horizontal slices of equal height.

The foregoing and other objects, features, aspects and advantages of the invention will become apparent from the following detailed description of the present invention which should be read in conjunction with the accompanying drawings.

BRIEF DESCRIPTION OF DRAWINGS

FIG. 3 represents an embodiment of a decompression system architecture, or MPEG decoder, according to the invention;

GENERAL ARCHITECTURE OF THE MPEG DECODER

Figure 1:
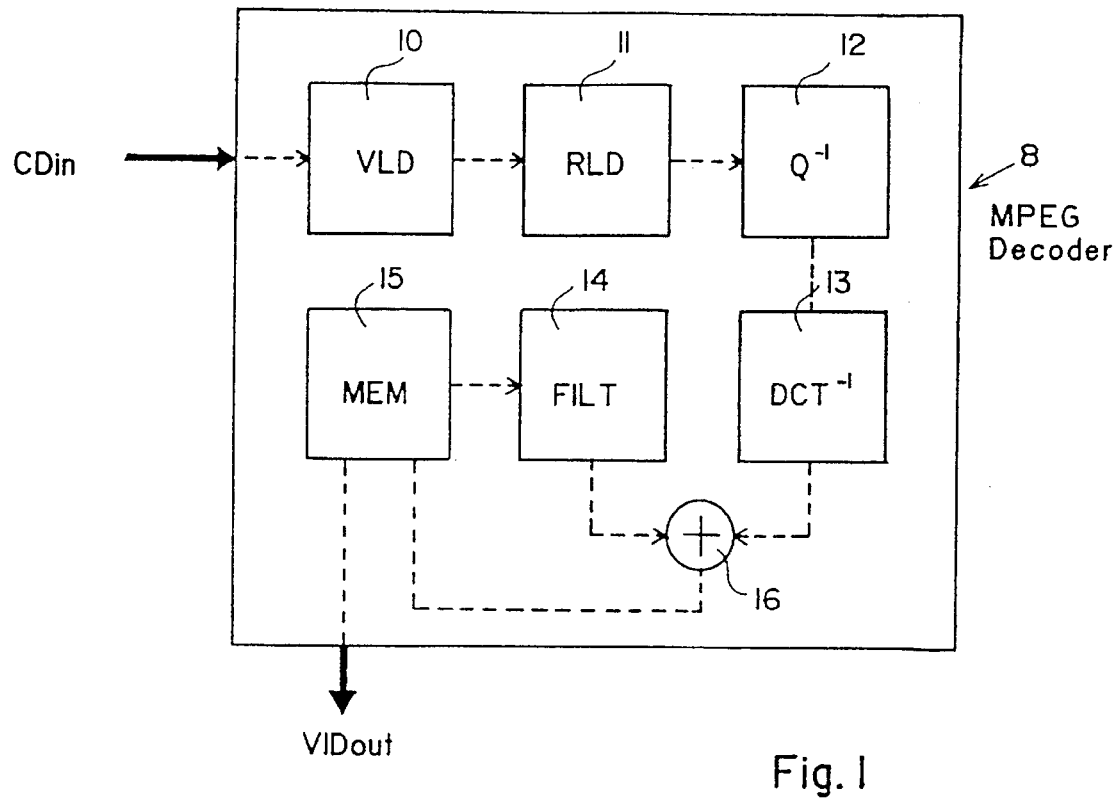
FIG. 1, above described, shows the main elements of an MPEG decompression system.

In FIG. 3, the elements already shown in FIG. 1 are designated with the same reference numerals.

A bus, hereinafter memory bus MBUS, couples the picture memory 15 to the compressed data input bus CDin, to the input of the variable length decoder (VLD) 10, to the input of the half-pixel filter 14, and to the input of a display controller 18. Bus CDin, decoder 10 and display controller 18 are connected to the memory bus MBUS through respective buffer memories (FIFOs) 20, 21, and 22. The half-pixel filter 14 includes two internal FIFOs that are connected to the memory bus MBUS. Exchanges on the memory bus MBUS are controlled by a memory controller (MCU) 24 that serves to carry out, upon request of the FIFOs, transfer operations between these FIFOs and the picture memory. To achieve this purpose, the memory controller 24 receives a plurality of requests RQ and provides corresponding acknowledgements ACK. The memory controller 24 can be such as the one described in the above patent application EP-A-0,503,956. A more advantageous embodiment of this memory controller will be described hereinafter.

According to the invention, the run-level decoder (RLD) 11, the inverse quantizer circuit ($Q^{-1}$) 12, and the inverse discrete cosine transform circuit ($DCT^{-1}$) 13 are connected according to a pipeline architecture, that is, these circuits 11–13 successively process data to decode, without these data temporarily transitting through a memory 15. The set of circuits 11–13 is referred to as a pipeline circuit hereinafter. The output of the half-pixel filter 14 is summed to the output of the $DCT^{-1}$ circuit 13 by an adder 16 that is coupled to the bus MBUS through a FIFO 26 controlled by the memory controller 24. Hand-shake lines HS1 and HS2 connect the adder 16 to the VLD circuit and to the $DCT^{-1}$ circuit, respectively.

According to an aspect of the invention, the VLD circuit 10 controls a bus VLDBUS intended to provide to the RLD circuit 11 data to be processed by the pipeline circuit 11–13, as well as parameters to the half-pixel filter 14, to the inverse quantizer circuit 12, to the display controller 18, and to the memory controller 24. A VLD circuit generally decodes the headers of the compressed data that it receives. As mentioned above, these headers include decoding parameters to be provided to the various elements of the system.

A macro-block header includes a quantizer scale to provide to the inverse quantizer circuit 12, a macro-block type parameter, and the components of the movement compensation vectors. These decoding parameters are decoded by the VLD circuit and respectively written in specific registers of the inverse quantizer circuit 12, of the half-pixel filter 14, and of the memory controller 24.

A picture header includes, as mentioned above, a picture type parameter and information on the use of the movement compensation vectors. These parameters are used by the VLD circuit itself to decode the vectors and data of the macro-blocks.

A sequence header includes two quantizer tables that are extracted by the VLD circuit and provided to two respective registers of the inverse quantizer circuit 12. The picture headers contain scaling or truncating parameters concerning the displayed picture, that are decoded by the VLD circuit and provided to the display controller 18.

The VLD circuit executes write operations on the bus VLDBUS as it decodes the headers. The write operations of the VLD circuit on bus VLDBUS can be interrupted by the RLD circuit 11 when the latter can no longer receive data to be processed. This is represented by a hand-shake connection HS3.

A sequencer 28 provides an enable signal EN of the VLD circuit. Sequencer 28 receives display (horizontal, vertical) synchronization signals H/VSYNC through the display controller 18, a macro-block synchronization signal MBS from the half-pixel filter 14, and an end of picture signal EOP from the VLD circuit 10. The sequencer 28 provides the memory controller 24 with a picture synchronization signal ISYNC that is active when the end of picture signal EOP and the vertical synchronization signal VSYNC are both active. The role of sequencer 28 will be explained subsequently.

As previously indicated, to reconstruct a picture, it is often necessary to use picture portions of two previously decoded pictures. To achieve this purpose, memory 15 must include three picture areas IM1, IM2, and IM3 to store the currently reconstructed picture and two previously decoded pictures. Memory 15 further includes an area CD to temporarily store compressed data arriving on bus CDin prior to being processed.

Control of the picture memory areas

To know in which memory areas IM1–IM3 the memory controller 24 must write, the latter uses four picture pointers ImPt provided by the VLD circuit. The VLD circuit includes a unit for calculating the picture pointers from the picture type parameters that are provided by the picture headers. Hereinafter, an exemplary picture succession and the method for calculating the picture pointers are described.

Consider the following succession of compressed pictures arriving on bus CDin:

I0, P1, B2, B3, P4, B5, B6 where letters I, P and B respectively designate an intra picture, a predicted picture, and a bidirectional picture. According to MPEG standards, a bidirectional picture can not be used to calculate another picture. Thus, the reconstruction of picture P1 requires picture I0, the reconstruction of pictures B2 and B3 requires pictures I0 and P1, the reconstruction of picture P4 requires picture P1, and the reconstruction of pictures B5 and B6 requires pictures P4 and P1.

These pictures are displayed in the following order:

I0, B2, B3, P1, B5, P4, B6 since a predicted picture P is reconstructed from a former picture in the display order, and since a bidirectional picture B is reconstructed from two pictures, one former and the other subsequent in the display order.

To determine the memory area IM1–IM3 which the memory controller 24 must access, four picture pointers RP, FP, BP, and DP are used, respectively indicating the locations of the currently reconstructed picture, of the former (forward) picture, of the subsequent (backward) picture, and of the currently displayed picture. The following table sums up the values of the picture pointers during the decoding of the above succession.

| Decode  | I0  | P1  | B2  | B3  | P4  | B5  |
| ------- | --- | --- | --- | --- | --- | --- |
| Display | —   | I0  | B2  | B3  | P1  | B5  |
| RP      | IM1 | IM2 | IM3 | IM3 | IM1 | IM3 |
| FP      | —   | IM1 | IM1 | IM1 | IM2 | IM2 |
| BP      | —   | —   | IM2 | IM2 | —   | IM1 |
| DP      | —   | IM1 | IM3 | IM3 | IM2 | IM3 |

When the first picture I0 is decoded, no picture is displayed yet. The reconstructed picture pointer RP indicates an empty area, for example area IM1, to store picture I0.

When picture P1 is decoded, picture I0 must be displayed. The reconstructed picture pointer RP indicates for example area IM2, and the displayed picture pointer DP indicates the area IM1 in which picture I0 is located. Since the predicted picture P1 needs the forward picture I0 in its reconstruction, the forward picture pointer FP also indicates area IM1.

When the bidirectional picture B2 is decoded, this picture B2 is also the picture to be displayed, The reconstructed picture pointer RP and the displayed picture DP both indicate the area IM3 that is still free. In its decoding, picture B2 needs the forward picture I0 and the backward picture P1; the forward picture pointer FP and the backward picture BP indicate areas IM1 and IM2, respectively.

To be able to display a picture as it is being decoded, the effective display is generally delayed by approximately one half picture; the area IM3 is sufficiently filled when picture B2 starts to be displayed.

When picture B3 is decoded, it is also the picture to be displayed. Since picture B3 also needs pictures I0 and P1 in its decoding, pictures I0 and P1 remain stored in the areas IM1 and IM2 that are still indicated by of the forward picture FP and backward picture BP pointers. Picture B3 can only be stored in area IM3, that is indicated by the reconstructed picture RP and the displayed picture DP pointers.

However, when picture B3 sharks to be reconstructed in area IM3, the picture B2, that is also stored in area IM3, is being displayed. If the displayed picture B2 is liable to be overwritten by the reconstructed picture B3, the VLD circuit that is providing the data of picture B3 is stopped. The role of the above sequencer 28 is to stop the VLD circuit by disabling the enable signal EN when the number of decoded macro-blocks corresponds to a picture fraction greater than the displayed picture fraction. The size of this fraction is determined by counting the number of horizontal synchronization pulses HSYNC and the number of decoded macro-blocks is determined by counting the number of macro-block synchronization pulses MBS.

When picture P4 is being decoded, picture P1 must be displayed. Picture P4 is stored in area IM1 that is then free; the reconstructed picture pointer RP indicates area IM1; the displayed picture pointer DP indicates area IM2 where picture P1 is stored. Picture P4 needs the forward picture P1 in its decoding; the forward picture pointer FP indicates area IM2.

When picture B5 is decoded, it must also be displayed. Picture B5 is stored in the area IM3 that is freed; the reconstructed picture RP and the displayed picture DP pointers indicate the area IM3. Picture B5 needs the forward picture P7 and the backward picture P4 that were previously decoded; the forward picture FP and backward picture BP pointers indicate the areas IM2 and IMP, respectively, and so on.

Operation of the MPEG decoder

Figure 4:
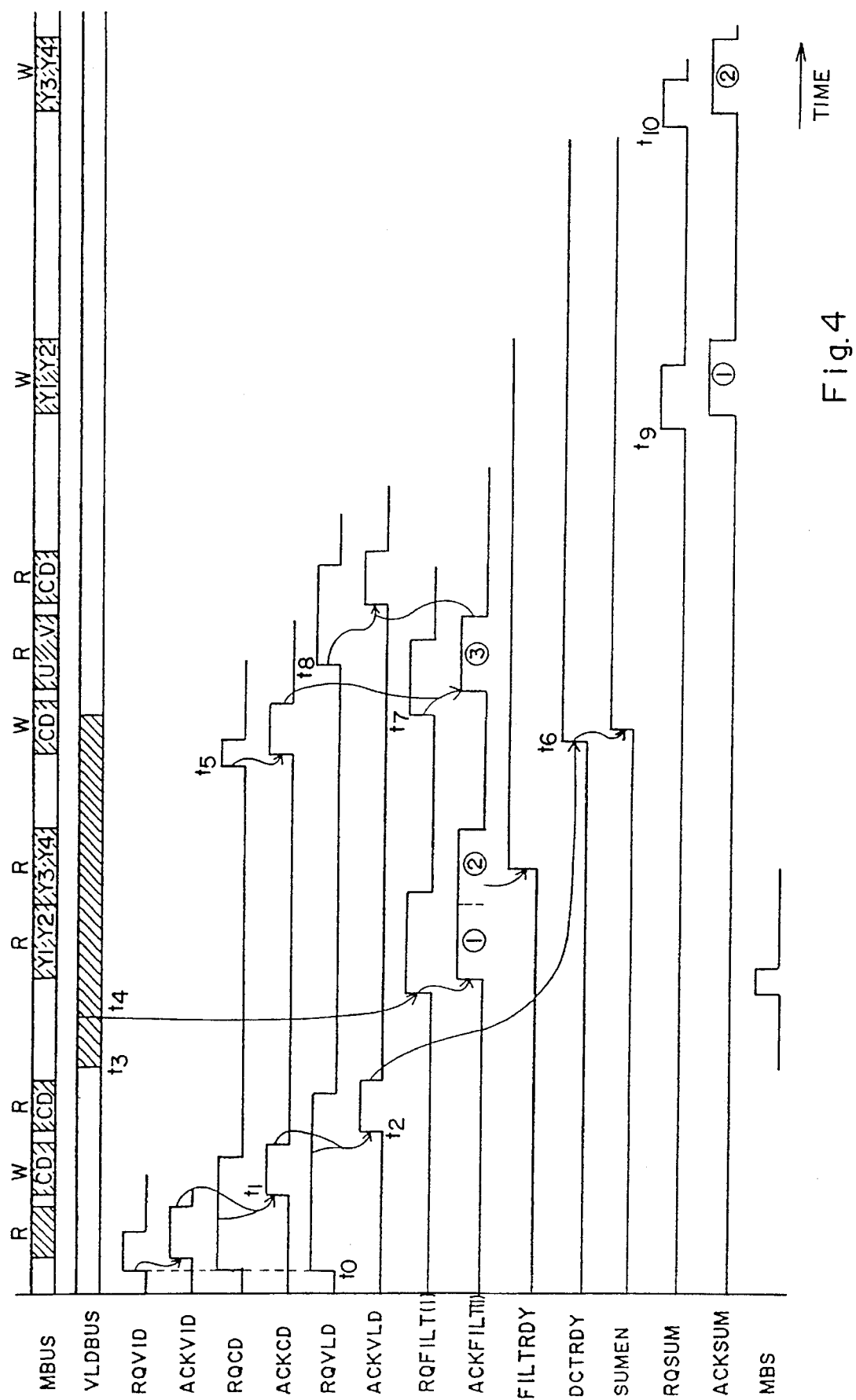
FIG. 4 is a timing diagram illustrating the operation of the decompression system of FIG. 3.

FIG. 4 is a timing-diagram schematically illustrating an exemplary operation of the system of FIG. 3. FIG. 4 represents request signals RQ and corresponding acknowledge signals ACK of the various elements of the system, according to a decreasing level of priority from top to bottom. Hatched areas represent operations on the memory bus MBUS and on the parameter bus VLDBUS.

The first pair of request and acknowledge signals RQVID, ACKVID corresponds to the FIFO 22 of the display controller 18. The second pair of signals RQCD, ACKCD, corresponds to the FIFO 20 of the compressed data input bus CDin. The pair of signals RQVLD, ACKVLD corresponds to the FIFO 21 of the VLD circuit 10.

The pair of signals RQFILT(1), ACKFILT(1) corresponds to one of six possible requests generated by the half-pixel filter 14. The pair RQSUM, ACKSUM corresponds to the FIFO 26 that provides the reconstructed macro-blocks. FIG. 4 also shows the waveforms of a signal FILTRDY that indicates to adder 16 that the half-pixel filter 14 is ready to provide data; of a signal DCTRDY that indicates to adder 16 that the $DCT^{-1}$ circuit 13 is ready to provide data; and of a signal SUMEN that enables stacking the sums provided by adder 16 in the FIFO 26. The macro-block synchronization signal MBS provided by the half-pixel filter 14 to the memory controller 24 and to the sequencer 28 is also shown.

FIG. 4 is described in an example where the memory bus MBUS includes a 64-bit data bus and where the size of the FIFOs is two packets of data, one packet of data corresponding to a macro-block fraction. The FIFOs (20 and 26) which write on the bus MBUS issue a request when their content exceeds one half of their capacity, and the FIFOs (21, 22, of filter 14) which read on the bus issue a request when their content is lower than one half of their capacity.

At time $t_0$, requests RQVID, RQCD and RQVLD are issued; the FIFOs 22, 20, and 21 are practically empty. Since the request RQVID has the highest priority, it is acknowledged by the signal ACKVID shortly after time $t_0$. When signal ACKVID is active, the memory controller 24 reads in the adequate area of memory 15 (indicated by the displayed picture pointer DP) pixels to be displayed and stacks them in the FIFO 22. When the content of the FIFO 22 exceeds one half of its capacity, the request RQVID is disabled. However, the task continues (the signal ACKVID remains active) as long as a full packet, of predetermined size exploitable by the display controller 18, has not been transferred. (In fact, as will be seen hereinafter, to improve the efficiency of the system, a transfer task is partitioned into several non-interruptible transfer sub-tasks).

The memory 15 contains pictures that are stored in macro-block order, but these pictures must be provided to the display controller 18 in line order. Thus, the transfer task of the memory controller 24 is also to calculate adequate addresses to read the data in line order.

At time $t_1$, immediately after the disabling of the acknowledge signal ACKVID, the request RQCD is acknowledged by issuing signal ACKCD. The memory controller 24 then transfers the compressed data of the FIFO 20 to the area CD of memory 15. When the content of the FIFO 20 is lower than one half of its capacity, the request RQCD is disabled but, as above, the transfer of data continues until a full packet of data is transferred. The compressed data are written in the memory 15 in the order they arrived.

At time $t_2$, immediately after the acknowledge signal ACKCD is disabled, the request RQVLD is acknowledged by the issue of signal ACKVLD. The memory controller 24 then transfers the compressed data from memory 15 to the FIFO 21, in the order they were written. When the content of FIFO 21 is higher than one half of its capacity, its request RQVLD is disabled, but transfer continues until a full packet of data is transferred.

Then, the VLD circuit starts to unstack and to process the data contained in the FIFO 21. At time $t_3$, the VLD circuit decodes a macro-block header and provides the decoded parameters through bus VLDBUS to the elements that require them. Especially, a macro-block type is provided to the half-pixel filter 14, a quantizer scale is provided to the inverse quantizer circuit 12, and vectors are provided to the memory controller 24 as well as to the half-pixel filter 14.

At time $t_4$, all the parameters have been provided and the VLD circuit starts to provide picture data to be decoded to the RLD circuit 11 . Once it has received the macro-block type and the vectors, the filter 14 is ready to receive a predictor macro-block. The filter 14 issues one RQFILT request according to the macro-block type it received. The filter 14 can issue up to six different requests on three request lines RQFILT, these different requests corresponding to the six different types of macro-block (intra, predicted, bidirectional; each macro-block being interlaced or progressive). In the present example, the request RQFILT(1) corresponds to a progressive predicted macro-block.

Since no request of higher priority is active, the request RQFILT(1) is acknowledged by issuing signal ACKFILT(1). The synchronization signal MBS is pulsed as the filter request is activated, which allows sequencer 28 to increment a macro-block counter for reasons mentioned previously, and allows the memory controller 24 to validate one or more vectors that it received through the VLD circuit.

Thus, shortly after time $t_4$, the acknowledge signal ACKFILT(1) is issued and the transfer to filter 14 of a predictor macro-block starts from a suitable area of memory 15 (indicated by the forward picture pointer FP). The filter 14 includes two FIFOs; one FIFO is intended to receive forward macro-blocks (of a forward picture); the other FIFO is intended to receive backward macro-blocks (of a backward picture). In the present example, the memory controller 24 receives a request corresponding to a predicted macro-block and issues an acknowledge signal ACKFILT(1) that selects the forward macro-block FIFO of filter 14. Depending on the filter request received by the memory controller 24, the latter issues one of three possible acknowledgements, for respectively selecting, in the filter 14, the forward macro-block FIFO, the backward macro-block FIFO, or indicating to the memory controller 24 that it must remain inactive (intra macro-block).

Figure 2A:
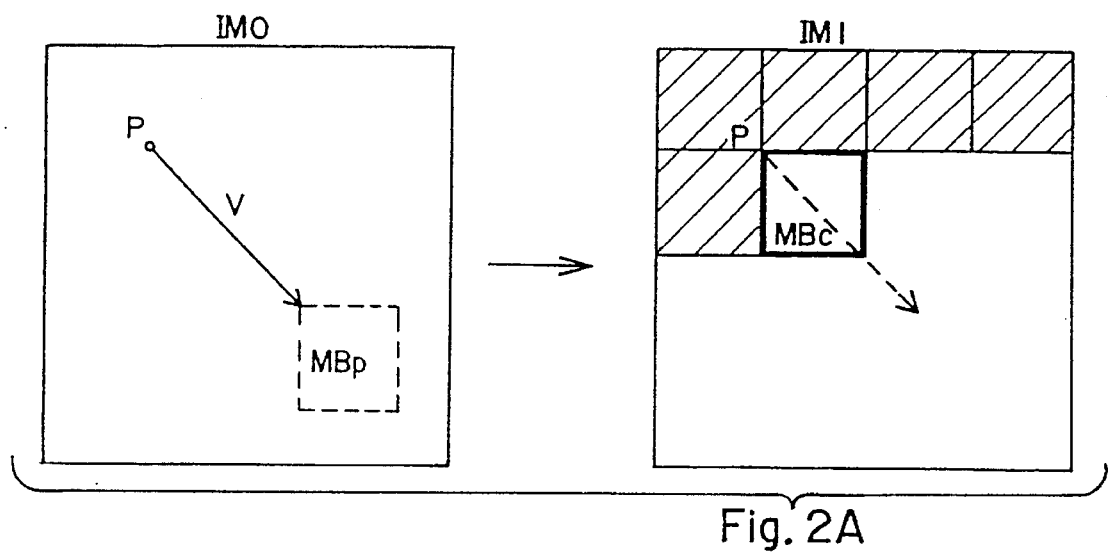
FIG. 2A illustrates a decoding step of a macro-block.
Figure 2B:
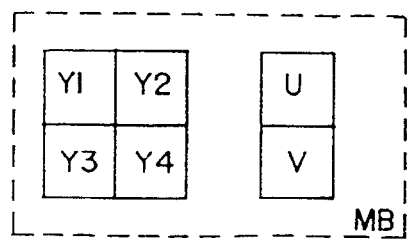
FIG. 2B represents an exemplary macro-block structure.

If data are transferred on 64 bits of the bus MBUS and if the macro-blocks correspond to portions of 16×16-pixel pictures, the transfer of a 4:2:0-format macro-block (FIG. 2B) is carried out, in a simplified case, in three phases numbered from 1 to 3 in FIG. 4. The luminance and chrominance pixels are coded on 8 bits. Thus, one word transferred on bus MBUS corresponds to 8 pixels. Each transfer phase is carried out in 16 cycles to successively transfer the two luminance blocks Y1 and Y2, the two luminance blocks Y3 and Y4, and then the two chrominance blocks U and V. The capacity of the FIFOs of filter 14 is of four 8×8-pixel blocks. The filter 14 issues one of the six possible requests when the content of the corresponding FIFO is lower than one half of its capacity.

In practice, which is not described in relation with FIG. 4, a predictor macro-block provided to the filter includes a 17×17-pixel luminance block (Y1–Y4), and a 9×18-pixel chrominance block U and V. In addition, the pairs of blocks to be transferred (Y1, Y2; Y3, Y4; U, V) are not necessarily "aligned" with the 64 data bits of bus MBUS, which involves that a luminance block (136 bits wide) must be transferred in three phases of 17 read cycles, and that a chrominance block (76 bits wide) must be transferred in two phases of 18 read cycles. Indeed, each line of pixels of the luminance block overlaps three 64-bit words which are accessible through bus MBUS, and each line of the chrominance block overlaps two 64-bit words. The filter 14 must then extract the luminance and chrominance blocks from the accumulation of data that it receives.

At the beginning of the first transfer phase 1 of the simplified example, the corresponding FIFO of filter 14 is empty. At the end of phase 1, blocks Y1 and Y2 are fully transferred, but filter 14 has started to empty the FIFO; the request RQFILT(1) remains active and the transfer phase 2 immediately starts. During phase 2, the FIFO reaches its half full state; the request RQFILT(1) is disabled, but the transfer phase continues until blocks Y3 and Y4 are fully transferred.

Once the filter 14 has received the first blocks Y1 and Y2, it is ready to provide filtered data to adder 16. The filter 14 activates a line FILTRDY (of hand-shake HS1 in FIG. 3) to indicate this state to adder 16. Adder 16 responds through another signal (not shown) of hand-shake HS1, that it is not ready to receive the data because the DCT$^{-1}$ circuit is not yet ready to provide data, which is indicated by an inactive signal DCTRDY when signal FILTRDY is enabled.

At time $t_6$, the DCT$^{-1}$ circuit can start to provide the data that were introduced from time $t_4$ into the RLD circuit 11. The signal DCTRDY of hand-shake HS2 is enabled, and the adder 16 enables a signal SUMEN indicating to filter 14 and to the DCT$^{-1}$ circuit that additions may start. The results of the additions are stacked in the FIFO 26.

At time $t_9$, the FIFO 26 is half full and issues a request RQSUM. This request has the lowest priorityl but since no other request is active, it is acknowledged shortly after by the activation of an acknowledge signal ACKSUM. Then starts a transfer phase 1 of blocks Y1 and Y2 of the reconstructed macro-block to the suitable area (indicated by the reconstructed picture pointer RP) of memory 15. The request RQSUM is disabled during the transfer of these blocks Y1 and Y2, but the transfer continues until blocks Y1 and Y2 are entirely transferred.

At time $t_{10}$, the FIFO 26 is again half full and then starts a phase 2 for transferring blocks Y3 and Y4 of the reconstructed macro-block, and so on.

The above description concerns a very simplified chaining of the main tasks carried out in the system of FIG. 3. In practice, any task is randomly interrupted by tasks having a higher priority.

For example, at time $t_5$, prior to time $t_6$, the request RQCD is again enabled for transferring the compressed data contained in the FIFO 20 to the memory 15.

At time $t_7$, the filter 14 issues the request RQFILT(1) in order to receive the chrominance blocks U and V from the predictor macro-block that is being processed by the filter. This request is acknowledged by the acknowledge signal ACKFILT(1) only when the acknowledge signal ACKCD is disabled, that is, when a full packet of compressed data has been transferred from the FIFO 20 to the memory 15. Blocks U and V then start to be transferred to the filter 14, which corresponds to the above third phase.

At time $t_8$, while the request RQFILT(1) is still active, a request RQVLD having a higher priority is issued. However, the transfer of two blocks of a macro-block (U and V in the present case) is a non-interruptible elementary task. Thus, before acknowledging signal RQVLD by enabling signal ACKVLD, the system waits until the request ACKFILT(1) is disabled.

Since some tasks can be interrupted at any time by tasks having a higher priority, the tasks are not periodically chained. The various decoding parameters (vectors, picture types . . . ) reach the circuits that require them at unforeseeable times. To enable circuits to take into account a parameter at a suitable time, each circuit includes registers in which the parameters are stacked as they arrive; then, the parameters are progressively unstacked or validated by a synchronization signal as they are used. To achieve this purpose, synchronization signals MBS, ISYNC, and VSYNC are provided.

Signal MBS is a macro-block synchronization signal that is activated by filter 14, for example, when it has received the parameters required for processing a predictor macro-block. Signal MBS is provided to the memory controller 24 so that it validates at a suitable time the vectors for fetching one or more predictor macro-blocks to be provided to filter 14.

Signal ISYNC, that is active both when the VLD circuit has detected the end of a picture (EOP) and when the display vertical synchronization signal is enabled, validates, in the memory controller MCU, a set of picture pointers ImPt at a suitable time. The signal ISYNC also resets calculation registers of the memory controller, used for calculating addresses of the data stored in the memory 15.

The memory controller used in the system of FIG. 3 is a specific advantageous processor that is described in more detail hereinafter. Indeed, a conventional processor communicates only through its bus; it is not designed to receive parameters in another manner than by its bus. In addition, in a conventional processor, a request corresponds to an interruption request, and an acknowledgement corresponds to a read or write operation of the device (FIFO) that issued the request.

Of course, it is possible to use a conventional processor. In this case, the picture pointers ImPt and the vectors are stacked in FIFOs that are connected to the memory bus MBUS. Then, the signals MBS and ISYNC correspond to interruption requests of highest priority so that the processor reads the parameters and stores them in an internal work register.

Memory Controller

Figure 5:
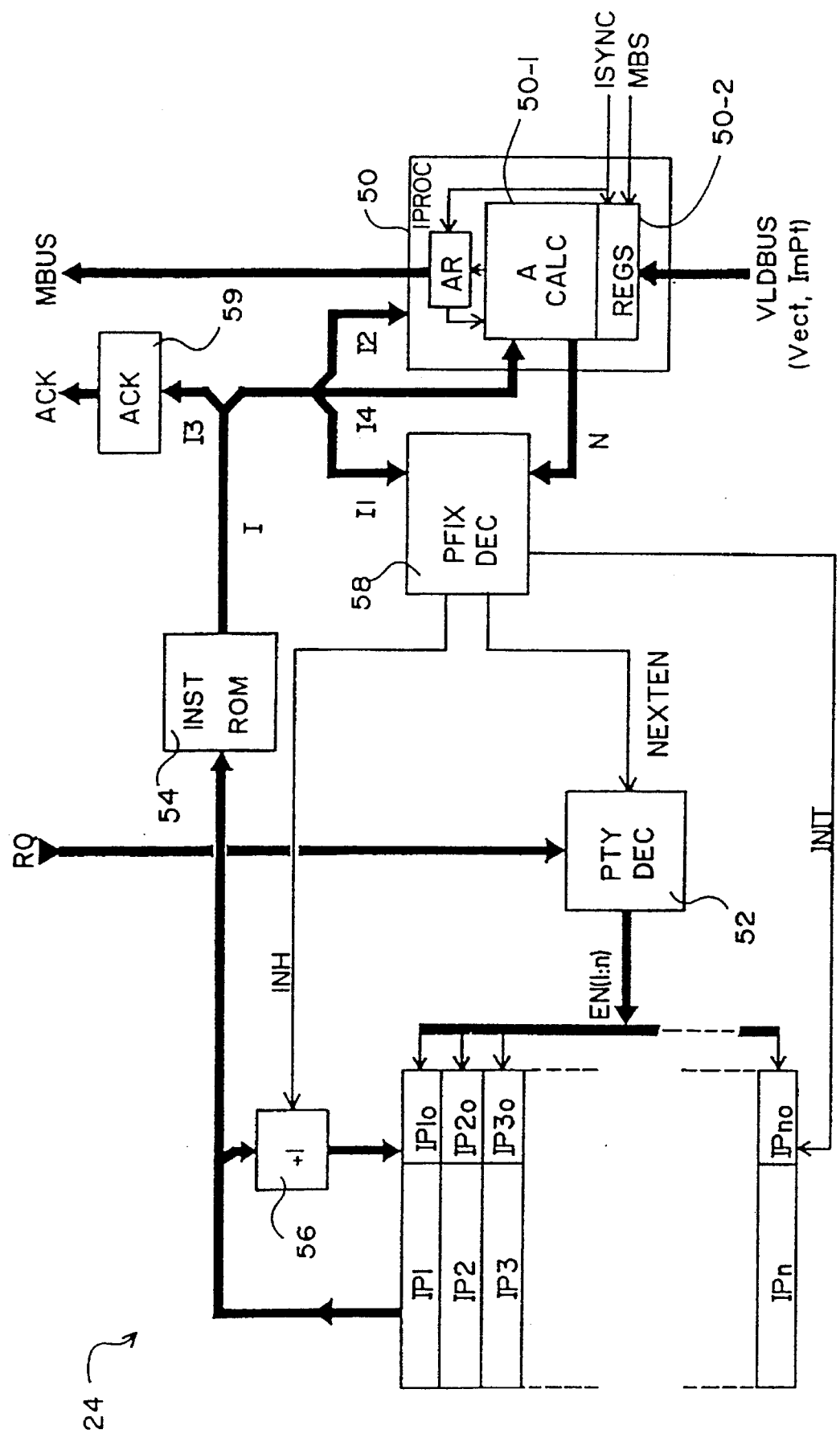
FIG. 5 represents an advantageous embodiment of a memory controller according to the invention.

FIG. 5 represents an embodiment of the memory controller according to the invention. Before describing this processor, the structure of a conventional is described below. This will better emphasize the advantages of a processor according to the invention and will facilitate the understanding of its structure.

A conventional processor includes an instruction processing unit. The instruction processing unit first receives, or loads, an instruction stored in a ROM or RAM through a system bus, and then executes this instruction. The execution of the instruction generally causes data to be transferred on the system bus between two memory locations or between the memory and the registers of the processor.

In a conventional processor, the address at which the instruction is fetched is contained in a single instruction pointer. If the processor must execute a plurality of concurrent tasks, a request is associated with each task. When a request arrives to the processor, it is interrupted and executes a new program associated with the new task. To be able to switch from one task to another, so-called "context save and context restore" procedures are used. These procedures consist in saving and restoring the content of the instruction pointer when, respectively, the execution of a program is interrupted and is resumed subsequently. This procedure is particularly time consuming in instruction cycles and limits the execution speed of the tasks.

In FIG. 5, in contrast, a memory controller 24 according to the invention includes a plurality of instruction pointers IP, IP2 . . . IPn, each corresponding to a possible task of data transfer on the memory bus MBUS. Each of these pointers may be enabled one at a time by a respective enable line EN1-ENn. When so enabled a pointer will provide its content as an instruction address at which an instruction should be fetched for the processing unit 50. The enable lines EN are controlled by a priority decoder 52 that receives the request lines RQ of bus RQ/ACK. Each request line of bus RQ/ACK is assigned a priority level. It is also possible to assign a same priority level to several tasks. In such a case, the decoder 52 must enable only one pointer IP at a time, for example by internally assigning different priority levels to these tasks and by circularly shifting these levels each time an instruction or a group of instructions is executed.

When a FIFO issues a request, it is ready to receive or provide data through the memory bus. The acknowledgement of a request can consist only in writing or reading data in the corresponding FIFO until the request disappears, the read or write cycles being carried out through the memory bus MBUS at addresses that are specific to the FIFOs. A more advantageous acknowledgement system is described later.

In addition, because the tasks that must be executed by the memory controller are predefined, the programs corresponding to these tasks are stored in a non-volatile instruction memory (ROM) 54 that is independent of the memory bus MBUS. The content of the enabled instruction pointer IPi is provided to the address input of ROM 54. The instruction processor 50 is coupled to the memory bus MBUS to cause transfers of data on this bus but is modified as compared to a conventional instruction processor to directly receive instructions from the ROM. Such a modification of a conventional processor can be easily achieved by those skilled in the art.

A conventional processing unit includes an instruction register and work registers that are coupled to a same bus. When an instruction is loaded, it is written in the instruction register, and when this instruction is executed, operations occur between the bus and the work registers. According to the invention, instead of coupling the instruction register to the memory bus MBUS, this instruction register (not shown) is coupled to the output of ROM 54. With such a configuration, an instruction is executed substantially as soon as it is loaded in the instruction processor 50. Thus, the memory bus MBUS is not needed to obtain instructions and, consequently, as many read cycles as instructions to be executed are spared. This represents a significant gain of time.

Operation of the memory controller

Upon powering-on, each instruction pointer IPi (i=1, 2 . . . n), which is a register, is initialized at a start value $IPi_0$ corresponding to the start address of the associated program. These start addresses correspond to hard wired data present on precharge inputs of the registers of the instruction pointers. The priority level associated with each program is determined by the priority decoder. For example, the priority decoder may assign as a priority level to a program the rank of the associated instruction pointer.

After the system is powered, requests on lines RQ appear. The priority decoder enables the instruction pointer IP associated with the request having the highest priority. The instruction processor 50 loads the instruction located at the address indicated by the enabled instruction pointer and executes this instruction. Once the instruction is executed, an incrementation circuit 56 increments the enabled instruction pointer. This provides the address of the next instruction to be executed by the instruction processor. The incrementation circuit 56 acts only on the enabled pointer. That is, the contents of the other pointers are not modified. The representation (+1) of the incrementation circuit 56 is symbolic; the instructions to be executed are not necessarily located at successive addresses, for example when the instructions have different lengths or when jump or sub-program call instructions are executed. In such a case, the enabled instruction pointer is incremented or decremented by the adequate value, as is known in conventional processors.

The rank (i) of an instruction pointer IP is used to designate the associated program (or task) and request.

When a request i has a higher priority than that of the program being executed, e.g., program i-1, decoder 52 enables the instruction pointer IPi instead of pointer IPi-1 immediately after a current indivisible group of instructions of program i-1 is executed. Request i is simultaneously acknowledged by the associated acknowledge line ACK. The instruction pointed at by the new enabled pointer IPi is loaded in the instruction processor 50 and is executed without any loss of time. That is, the new instruction is executed at the moment when the next instruction of program i-1 would have been executed.

Once the request i is disabled, the decoder 52 enables the instruction pointer corresponding to a new maximum priority task. The new task may be a task that was suspended by task i or may be a new task. If it is a suspended task, the associated program is executed immediately from its suspension point. If it is a new task that has not been started yet, it starts at the starting address.

As is readily seen, switching from one task to the other occurs without any dead time that would have been necessary in a conventional system to carry out context saving and restoring.

In a picture processing system, the programs associated with the data transfer tasks are designed to be executed in endless loops. Thus, the last instruction of such a program is a jump to the first instruction of the program. This jump can be conventionally managed by the incrementation circuit 56. An optimal method for controlling loops according to the invention is described later.

As mentioned above, it is desirable to complete the execution of a current group of instructions (i.e., transfer of a full packet of data) even if a request of higher priority than that of the current task is issued. In a conventional processor, specific instructions allow disabling and enabling of the servicing of interruption requests. However, in a processor according to the invention, such specific instructions are not suitable, since the conventional interruption system is not used.

To solve this problem, the present invention partitions each instruction I into a prefix I1 and a command I2. Prefix I1 is provided to a prefix decoder 58, and command I2, corresponding to a conventional instruction, is provided to the instruction processor 50. Prefix I1 indicates whether the current program can be suspended or not once the associated instruction is executed.

The prefix decoder 58 provides to the priority decoder 52 a signal NEXTEN that, if the prefix is at a specific value, inhibits the enabling of a new instruction pointer, even if a request of higher priority than that of the current program appears.

Optimization of the memory controller

The prefix I1 of the instructions is provided so as to indicate, by an adequate number of bits, not only whether or not the current program may be suspended after the current instruction, but also whether the current instruction should be executed a predetermined number of times. The prefix I1 may also be used to indicate whether the current instruction is the last instruction of the program (the utility of this possibility will be discussed below).

The prefix decoder 58 includes a down-counter of instruction cycles that is initialized by a number within prefix I1. This number can be a number selected amongst several constant numbers that are stored in the prefix decoder or a number N provided by the instruction processor 50. When such a loop instruction is executed, the prefix decoder 58 inhibits the incrementation circuit 56 during the desired number of instruction cycles. As a result, the loaded instruction is executed as many times as desired.

This method spares a jump instruction for each loop to be executed, which is a significant gain of time if only one instruction is to be executed several times consecutively. Such instruction loops are particularly useful when data are to be transferred by packets, which is the case in the present system.

If prefix I1 indicates that the currently executed instruction is the last one, once the instruction is executed, the decoder 58 provides a signal INIT to the set of instruction pointers IP, which causes an initialization of the enabled pointer only at the program start address.

With such a system, the instruction set of the processor can, in some cases, be restricted to a set that does not include any jump instruction, which significantly simplifies the processor, more particularly the incrementation circuit.

In the present processing system, the processing of data is carried out by specialized circuits. The memory controller only transfers data through the memory bus MBUS and calculates the adequate data addresses in the picture memory 15.

Each FIFO provides its content on the memory bus MBUS or receives the data that are present on the memory bus MBUS when this FIFO receives an acknowledge signal ACK. The signals ACK are provided by an acknowledge circuit 59 that receives an additional field 13 from each instruction I. With this configuration, the FIFOs, and any other read or write-only device connected to the memory bus MBUS, can be directly selected by the instruction being executed (more precisely by its field 13), without issuing any address on the memory bus. This may cause a datum that is read in the picture memory to be directly written in a write-only device, and may cause a datum that is read in a read-only device to be directly written in the picture memory, without having to carry out a read cycle, followed by a write cycle. The acknowledge circuit 59 may be, if necessary, a decoder and/or a circuit for adequately formatting the acknowledgements (it may be necessary to delay the acknowledge signals, for example to give the picture memory time to present data on the bus before they are read by a FIFO memory).

As indicated above, a write-only FIFO issues a request when its content is lower than a minimum content, for example equal to half the FIFO size. The task associated with a write-only FIFO transfers a packet of data from the picture memory to the FIFO, the size of this packet of data being fixed and, for example, equal to half the size of the FIFO.

Such a transfer operation consists in a looped execution, as indicated above, of a picture memory read instruction, the number of loops being determined by the prefix I1 of the read instruction. During each execution of the read instruction, the picture memory provides on the memory bus a datum that is immediately transferred into the FIFO.

A read-only FIFO issues a request when the number of data contained therein exceeds a maximum content, for example equal to half the size of the FIFO. The task associated with the FIFO transfers the content of the FIFO into the picture memory by packets of data. Each packet contains a fixed number of data equal, for example, to half the size of the FIFO.

Such a transfer operation consists in a looped execution of a picture memory write instruction, the number of loops being determined by the prefix I1 of the write instruction. Once the acknowledgement signal of the FIFO is activated, the FIFO provides its data on the bus at the execution rate of the write instructions. Thus, each datum provided by the FIFO on the bus is immediately written in the picture memory.

In order to determine the position in the picture memory from which packets of data must be transferred, it is possible, for example, to update a data pointer stored in the picture memory. The instruction processor includes an address register AR containing the address at which a transfer (read or write) operation is carried out. The beginning of a transfer program of a packet of data includes an instruction that writes in this address register AR the content of the data pointer. The subsequent instructions of the program are, for example, instructions to adequately modify the content of the address register at each read or write instruction. This adequate modification may consist in an incrementation (which amounts to write or to read data at successive addresses in the picture memory) or in a more complex calculation (for example a recursive calculation to extract a picture line from a sequence of macro-blocks).

However, the execution of the instructions modifying the address register AR at each execution of a transfer instruction requires that instructions be inserted, before or after the transfer instruction, which are executed in the same loop as the transfer instruction. This method is incompatible with the advantage provided by the use of prefix I1 that indicates that only the current instruction has to be looped.

To avoid this drawback and to further increase the speed of the system, the instruction processor includes an address calculation unit 50-1 that carries out, by hardware, a given number of predetermined functions of address calculation. Each calculation function of the calculation unit is selected by an additional field I4 of the instruction I being processed (field I4 can also correspond to acknowledge field I3). Thus, for each instruction to be executed, a specific address calculation function is selected. Each hard wired function is designed to modify the state of register AR in synchronism with the instruction cycles. This configuration allows the looped execution of a single read or write instruction. The read or write operation occurs at the address in register AR, which is automatically suitably updated at each loop by the hard wired function associated with the instruction.

As already mentioned, instead of storing the movement compensation vectors and the picture pointers in a FIFO connected to the memory bus MBUS, these parameters are stacked in registers 50-2 of the calculation unit 50-1. At each picture synchronization pulse ISYNC, the content of registers 50-2 is shifted so that the calculation unit 50-1 takes into account a new set of picture pointers. In addition, the address registers AR are initialized. At each macro-block synchronization pulse MBS, the content of the registers is shifted so that the calculation unit 50-1 takes into account a new set of vectors.

A transfer program of a packet of $\underline{n}$ data from a FIFO to the picture memory is now considered. This transfer program corresponds to the task initiated by a request provided by the FIFO. Number $\underline{n}$ is selected so that the FIFO disables its request once it has received n+1 data of the packet.

Such a program essentially consists of the following successive instructions:

One instruction to load in register AR the last address used during the last execution of the current task (this address being, for example, stored in the picture memory at a position assigned to the task). The prefix I1 of this instruction indicates that the task must not be suspended (by a task of higher priority) after the execution of the instruction. Fields I3 and I4 contain inactive values.

One transfer instruction, whose prefix I1 indicates that this instruction must be executed $\underline{n}$ times and that the task must not be suspended. Field I3 selects the FIFO to be used, and field I4 selects the hard wired address calculation function to be used.

One instruction to save the content of register AR, whose prefix I1 indicates that the execution of the program must resume from its first instruction and that the task may be suspended. Fields I3 and I4 contain inactive values.

Such a task can only pass control to a task of higher priority level at the last instruction of the program (which is the only instruction authorizing the suspension of the task), that is, when the whole packet of data is transferred. If the number $\underline{n}$ of data in a packet is high, it is necessary to pass control more frequently to a task of higher priority.

To achieve this purpose, a first approach consists in partitioning the packet of $\underline{n}$ data into p sub-packets of $n_1 \ldots n_i \ldots n_p$ data, respectively, and to provide a transfer program including p successive transfer sub-programs of $n_1 \ldots n_i \ldots n_p$ data, respectively. This addresses the case of the transfer of a macro-block in three sub-blocks. Each sub-program includes the three above-mentioned instructions, except that the transfer instruction is executed $n_i$ times instead of $\underline{n}$ times, and that only the save-AR instruction of the last sub-program indicates that the program must be resumed from its first instruction. This allows a task of higher priority at the end of each sub-program to gain control, that is, after a relatively short latency time at most equal to the transfer of $n_i$ data (instead of $\underline{n}$ data). This also allows to select, at each sub-program, a distinct address calculation function, and therefore to partition a complex calculation function into simple sub-functions, that may also be used for other tasks.

However, this approach requires the execution of a save instruction between two transfers of $n_i$ data and of an update instruction of register AR, which slows down the process.

A second approach, avoiding this drawback, consists in providing the instruction processor with as many address registers AR as hard wired calculation functions. Thus, each calculation function carries out operations on its own address register and, if the function is suspended (because the associated task is suspended) the associated address register maintains the address from which to continue once the function is reactivated. It is then unnecessary to update or save these address registers. As a result, a transfer program only consists of a possible first update instruction of an address register, a possible last save instruction and, therebetween, a series of transfer instructions, each of which is to be executed in loops, the prefix I1 of each transfer instruction indicating the number of loops.

The program must not be suspended during the execution of a looped instruction. To achieve this purpose, the field I1 of the looped instruction indicates by an active bit that the program must not be suspended. This active bit is accounted for by the prefix decoder that then does not authorize the activation of signal NEXTEN (serving to indicate that the current program may be suspended).

Use of a dynamic memory as a picture memory

A commonly used picture memory is a dynamic memory (DRAM). The advantage of DRAMs is that they are small-sized, inexpensive, and have a large storing capacity. However, DRAMs are accessed in two steps. Indeed, a DRAM is partitioned into several pages. Before reading or writing in a DRAM, a page must be selected by a specific addressing cycle; then a word must be selected in this page by a normal read or write cycle. Of course, once a page is selected, the words of this page are all accessible by normal read or write cycles.

To optimize the use of a DRAM, the luminance blocks of the macro-blocks are stored in a first page, and the chrominance blocks are stored in another page. The chrominance blocks are thus separated from the luminance blocks so as to store a whole number of blocks in a DRAM page. Suitable functions of the processing unit manage the separation and grouping of the blocks during transfers of macro-blocks.

Since a predictor macro-block MPp is determined by a random movement compensation vector, it can overlap several pages of the DRAM. Reading of the predictor is then more complex. In such a case, the selected calculation function provides a number N to the prefix decoder, this number N being calculated from the vector. Number N indicates, for example, the height in pixels of the predictor's columns within an upper page partially containing the predictor. Reading the predictor consists in executing, for each complete pixel column, first N times a read instruction to read the pixels of the first portion of the column that is contained in the upper page, then H-N times to read the remaining portion of the column in a lower page (H being the total height in pixels of a column), a page change being operated between the two read loops.

With this configuration, a predictor is read in a suitable order, which avoids the need for providing a complex address calculation function to reorder the pixels of the predictor and a buffer to temporarily store the predictor pixels before they are reordered. In the above EP-A-0,503,956 patent application, all the pixels of the partial predictor contained in a page are first read before reading the pixels of the partial predictor contained in another page, in order to minimize the number of page changes at the expense of a higher complexity.

According to the invention, it is possible to execute a larger number of page changes because the system is sufficiently fast. Additionally, this increase in the number of page changes practically represents about 4 clock cycles in one hundred, with a memory bus of 64 data bits.

MPEG decoder associated with a microprocessor

Figure 6:
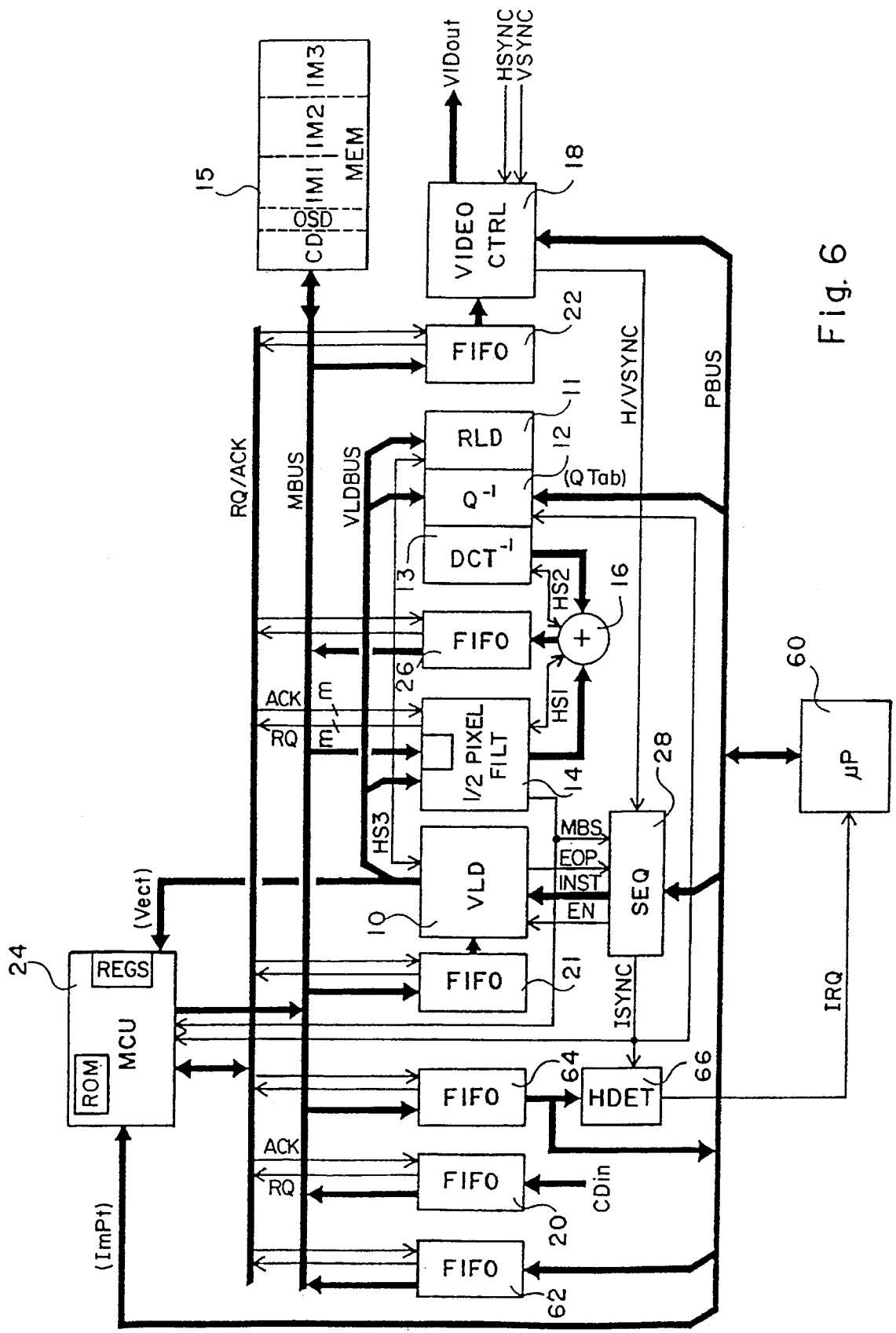
FIG. 6 represents another embodiment of a decompression system architecture according to the invention.

FIG. 6 represents an embodiment of an MPEG decoder according to the invention more particularly adapted to use private data provided by some headers.

An MPEG decoder is most of the time used in an apparatus, such as a television set or a microcomputer, including a microprocessor.

FIG. 6 shows the same elements as in FIG. 3 designated with the same reference numerals. The difference between this system and the system of FIG. 3 lies in the presence of a processor bus PBUS that is controlled by a microprocessor 60. The microprocessor 60 is designed to execute some of the tasks of the VLD circuit 10, that is, providing the configuration parameters to the display controller 18, providing the quantizer tables QTab to the inverse quantizer circuit 12, providing the picture pointers ImPt to the memory controller 24, and providing the decoding parameters (the "instruction") required by the VLD circuit (picture type and decoding information on the movement compensation vectors).

Moreover, the system includes two additional FIFOs, one FIFO, 62, for writing in the memory 15 data from the bus PBUS, and the other FIFO, 64, for writing on the bus PBUS data from the memory 15. The content of FIFO 64 is further used by a header detector 66 that receives the synchronization signal ISYNC and provides an interruption request IRQ to the microprocessor 60.

FIFO 64 receives the compressed data from memory 15. The header detector 66 is intended to detect the sequence and picture headers and to interrupt the microprocessor 60 when one of these headers is detected. The role of the microprocessor 60 is then to read the headers in the FIFO 64, to extract the parameters of these headers, to provide the quantizer tables to circuit 12, the configuration parameters to the display controller 18, the instruction for the VLD circuit to sequencer 28, and to calculate the four above-mentioned picture pointers (RP, FP, BP, DP) and to provide them to the memory controller 24.

Also, the microprocessor 60 extracts on-screen display data and private data from the headers. The on-screen display data are provided to the FIFO 62 and transmitted through the bus MBUS in an area OSD of the memory 15. The private data are stored in the memory (not shown) that is associated with the microprocessor 60 and are used by elements external to the decompression system.

With this configuration, the tasks to be carried out by the VLD circuit are reduced, which allows its speed to be increased and its complexity to be reduced. Of course, the VLD circuit still detects the sequence and picture headers, since it must detect headers, but it does not process them.

The transfers from the FIFO 62 to the memory 15 and the transfers from the memory 15 to the FIFO 64 are additional tasks that are carried out by the memory controller 24, these tasks being implemented by the request/acknowledge system described in relation with the other FIFOs. The task associated with the FIFO 62 has, for example, a priority comprised between the priorities of the FIFOs 20 and 22, and the task associated with the FIFO 64 has, for example, a priority comprised between the priorities of FIFOs 20 and 21.

The sequencer 28 of FIG. 6 plays an additional role with respect to the sequencer of FIG. 3. This role is to stack the instructions of the VLD circuit in registers and to provide them to the VLD circuit in synchronism with the signal ISYNC.

The microprocessor 60 takes over some of the MPEG decoder's tasks which would have been complex to implement by the decoder itself, but without significantly reducing the microprocessor's possibilities. Indeed, for a processor of the INTEL 486-type, for example, these tasks correspond to approximately 1% only of the microprocessor's possibilities and they can be processed by an interrupt routine of the lowest priority.

Processing of high definition pictures

A decompression system, or MPEG decoder, according to the invention is capable of processing standard definition television pictures (for example, 720×480-pixel pictures). To process high definition pictures, the calculating power must be increased. For example, to process high definition pictures of 1440×960 pixels, at least four MPEG decoders must operate in parallel.

Figure 7:
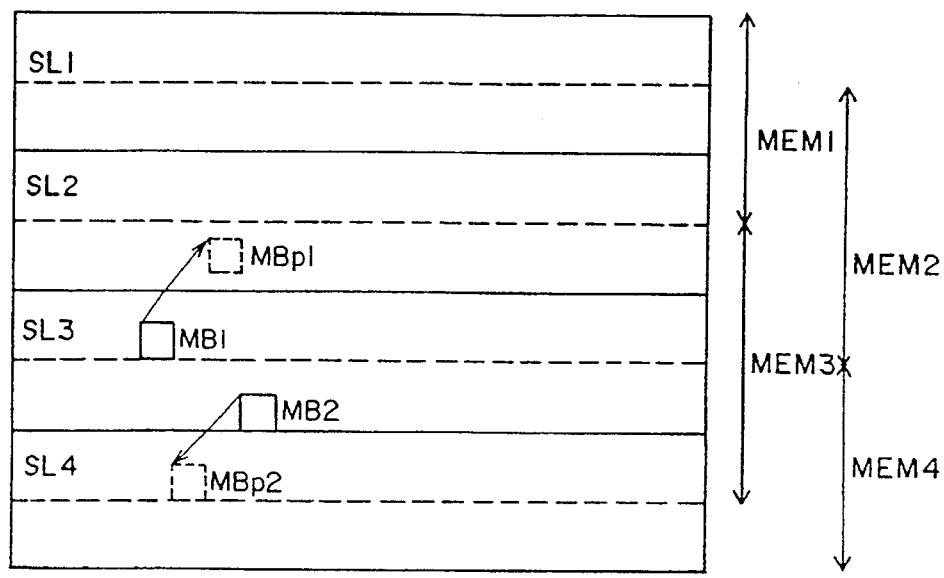
FIG. 7 illustrates a high definition television picture that is to be processed by slices by a plurality of parallel decompression systems.

FIG. 7 represents a high definition picture partitioned into four slices SL1–SL4, each of which is processed by a respective MPEG decoder.

Figure 8:
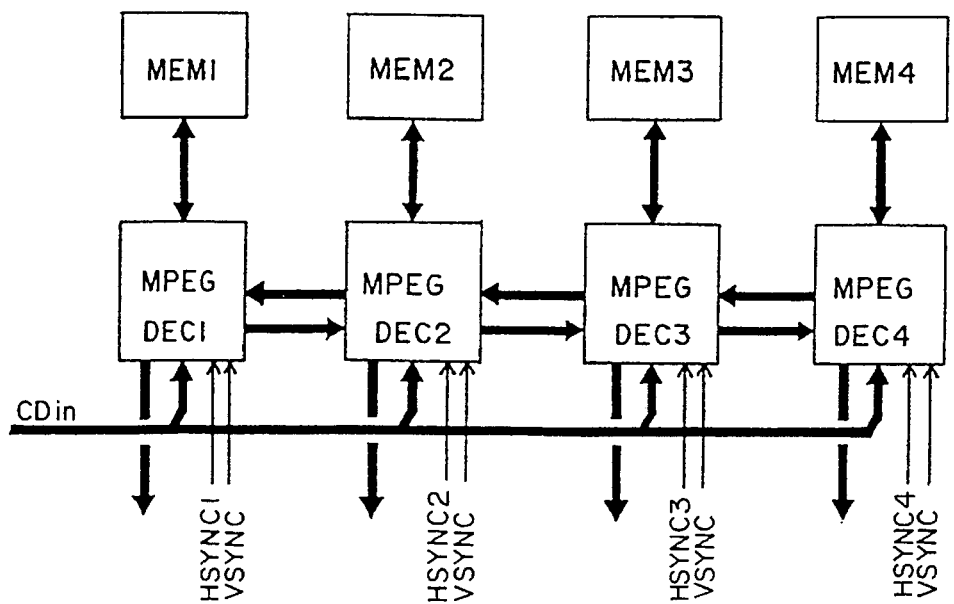
FIG. 8 represents a plurality of decompression systems connected in parallel to process a high definition picture.

FIG. 8 represents four MPEG decoders connected so as to process the four slices of the high definition picture. The input of each MPEG decoder is connected to the compressed data bus CDin, and each decoder operates with a respective picture memory. The display controller of each decoder receives the display synchronization signals corresponding to the associated slice only and the data provided by these display controllers are multiplexed. Thus, the display controller of one decoder receives bursts of horizontal synchronization pulses HSYNC each time the associated slice is displayed, and receives a vertical synchronization pulse VSYNC indicating transitions from one picture to another.

However, it is not sufficient to simply arrange a plurality of decoders in parallel. Indeed, referring to FIG. 7, to reconstruct a macro-block MB1 of the upper portion of slice SL3, for example, it may be necessary to use a predictor macro-block MBp1 that is in the lower portion of slice SL2. Similarly, to reconstruct a macro-block MB2 at the lower portion of slice SL3, it may be necessary to use a predictor macro-block MBp2 that is in the upper portion of slice SL4. In other words, the decoder associated with slice SL3 should be able to access the memories of the decoders associated with slices SL2 and SL4.

The present invention proposes a simple modification of the MPEG decoder, used for decoding standard definition pictures. This modification allows to associate in parallel any number of such MPEG decoders to process pictures of any definition.

To achieve this purpose, the invention increases the size of the memories associated with the decoders so that each memory contains the associated slice as well as margins corresponding to boundary areas of the adjacent slices. The height of the boundary areas is determined by the maximum vertical amplitude of the movement compensation vectors. Hereinafter, it is assumed that this amplitude corresponds to the height of one half picture slice. Thus, a memory associated with a slice has a size adapted to contain the associated slice, the lower half of the adjacent upper slice and the upper half of the adjacent lower slice. Of course, the sizes of the memories of the extreme decoders are adapted to contain the associated slice and one half slice.

With this configuration, all predictor macro-blocks used to reconstruct a macro-block of a slice can be accessed by the memory controller of the decoder that is associated with this slice.

In addition, between each decoder, there is provided an exchange system allowing a decoder to provide the data of its slice to its memory and to provide the same data to the memories of the adjacent decoders.

Figure 9:
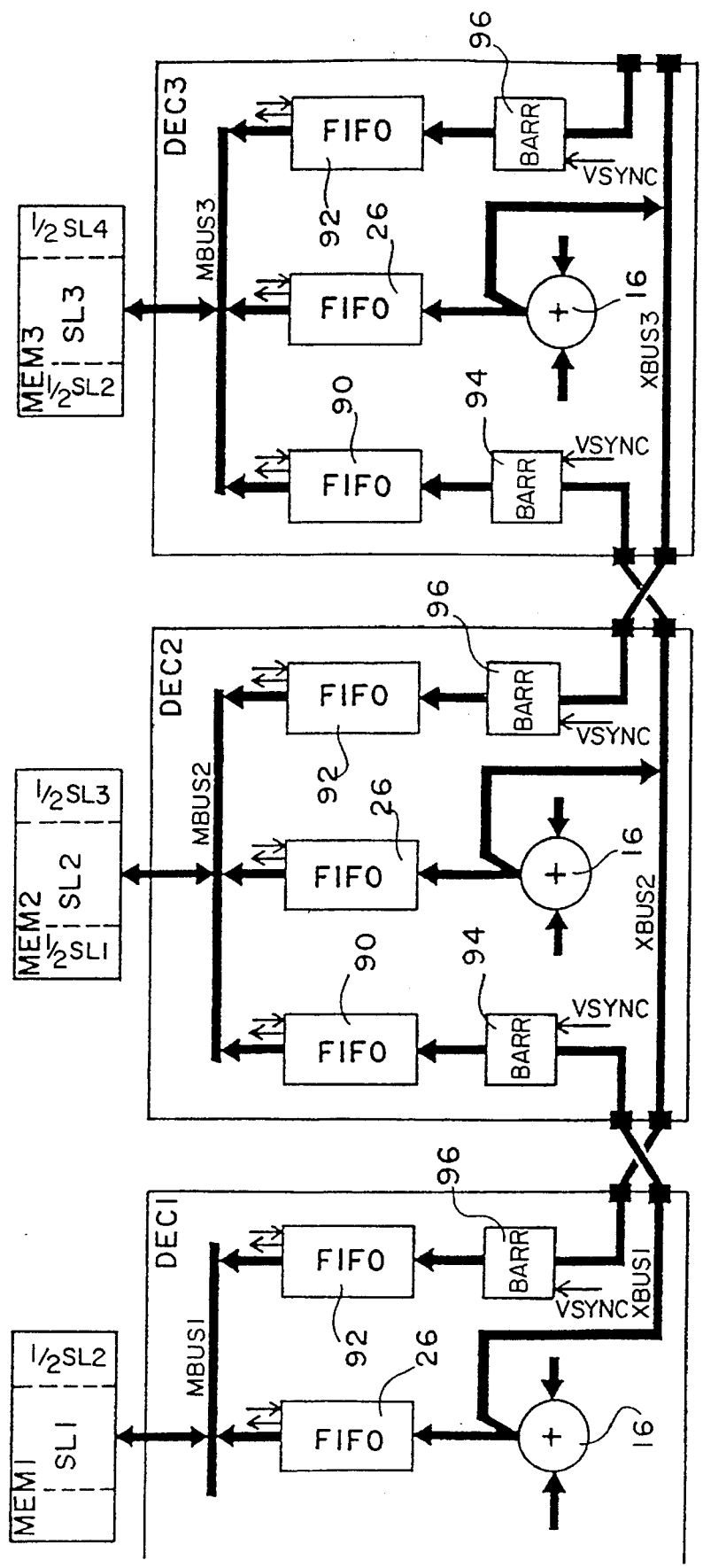
FIG. 9 partially represents an embodiment of an internal structure of a decoder according to the invention that allows an easy parallel connection.

FIG. 9 partially represents the internal structure of two decoders according to the invention that are connected in parallel. In each decoder are shown the adder 16 and the FIFO 26 for providing the reconstructed macro-blocks to the decoder memory. The adder 16, as it provides data to the decoder's memory through FIFO 26, simultaneously provides the same data on an exchange bus XBUS that is connected to the adjacent decoders. Each decoder further includes two FIFOs 90 and 92 that are connected to the memory bus MBUS of the decoder and that respectively receive the data from the exchange buses of the two adjacent decoders. Like the other FIFOs of the decoder, the data of FIFOs 90 and 92 are transferred to the decoder's memory through a request/acknowledge system carried out by the memory controller of the decoder. The task associated with the FIFO 90 is to transfer the data from the FIFO 90 to a memory area 1/2SL of the upper boundary slice, and the task associated with the FIFO 92 is to transfer data from the FIFO 92 to a memory area 1/2SL of the lower boundary slice.

Since all the data of a slice SL are provided on the exchange bus XBUS, the FIFOs 90 and 92 are preceded by a barrier circuit 94 and 96, respectively, to filter the data of the corresponding half slice. To achieve this purpose, a barrier circuit 94 includes a data counter that authorizes the transfer of data to the FIFO 90 as soon as the number of counted data reaches the number of data of one half slice. A barrier circuit 96 includes a data counter that authorizes the transfer of data to the FIFO 92 up to the moment when the number of counted data reaches the number of data of one half slice. The counters of the barrier circuits 94 and 96 are initialized between the display of two slices, for example by the vertical synchronization signal VSYNC.

A high definition picture processing system according to the invention requires a memory size increased by 75% with respect to that of four individual MPEG decoders. However, the cost of this increased memory size is compensated by the simplicity of the system.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A motion picture decoder for processing compressed data arriving in packets corresponding to picture blocks, said packets being separated by headers having decoding parameters of the packets, said system including:

a first plurality of processing elements using said decoding parameters in processing data in the packets;

a memory bus connected to a picture memory and the first plurality of processing elements;

a memory controller connected to the memory bus to exchange data between the picture memory and the first plurality of processing elements at rates adapted to the processing rates of said elements;

a variable length decoder, connected to the memory bus to receive the compressed data, that extracts packets and decoding parameters from the compressed data;

a pipeline circuit having a second plurality of processing elements connected to process packets in pipelined fashion; and a parameter bus connected to the variable length decoder and the pipeline circuit to provide packets and decoding parameters to the pipeline circuit to be processed, and to provide decoding parameters to the first plurality of processing elements of the system;

wherein the pipeline circuit includes:

a run-level decoder connected to the parameter bus to receive the packets;

an inverse quantizer circuit directly receiving processed packets output by the variable length decoder, and connected to the parameter bus to receive quantizer scale coefficients among the decoding parameters; and an inverse cosine transform circuit directly receiving processed packets output by the inverse quantizer circuit and coupled to the memory bus to store decoded blocks in the picture memory.

2. The motion picture decoder of claim 1, wherein the memory controller is connected to the parameter bus to receive motion compensation vectors among the decoding parameters; and further including a combination circuit as one of the first plurality of processing elements connected to the memory bus and to the inverse cosine transform circuit to store picture memory decoder blocks that are a combination of blocks output by the inverse cosine transform circuit and of respective predictor blocks fetched in the picture memory by the memory controller at locations determined by the movement compensation vectors.

3. The motion picture decoder of claim 2 wherein each packet of compressed data is preceded by a block header, and wherein the packets come in successive groups, each group of packets being preceded by a group header containing group decoding parameters and private and on-screen display information, the decoder further including:

a microprocessor;

a processor bus, connected to the microprocessor to supply at least a portion of the group parameters to the memory controller, the variable length decoder, and the inverse quantizer circuit, and to supply the display information to a display controller of the first plurality of processing elements;

a buffer memory, connected to the processor bus, receiving the compressed data through the memory bus; and a group header detector connected to said buffer memory to generate interrupts of the microprocessor when a group header is detected in the compressed data.

4. The motion picture decoder of claim 3, wherein a transfer of data between the picture memory and one element connected to the memory bus corresponds to a specific task that is initiated or continued when the one element issues a request to receive data, all possible concurrent tasks being carried out by the memory controller according to a task priority management.

5. The motion picture decoder of claim 4, wherein elements that exchange data with the picture memory are connected to the memory bus through respective write- or read-only buffer memories, a write-only buffer memory being emptied by the associated element and issuing a request to receive data through the memory bus when its content reaches a lower limit, and a read-only buffer memory being filled by the associated element and issuing a request to provide data on the memory bus when its content reaches an upper limit.

6. The motion picture decoder of claim 5, wherein the combination circuit includes:

a filter connected to the parameter bus to receive block types among the decoding parameters, said filter issuing distinct requests, according to the block types, to receive corresponding predictor blocks provided by the memory bus as a function of the vectors received by the memory controller; and an adder to provide on the memory bus the sum of the outputs of the filter and the cosine transform circuit.

7. The motion picture decoder of claim 6, wherein the group header detector generates interrupts of the microprocessor when the associated buffer memory contains a picture sequence header or a picture header, the microprocessor being programmed to respond to these interrupts by reading, in the buffer memory associated with the group header detector, quantizer tables that the microprocessor provides to the inverse quantizer circuit, information on the picture type and on the amplitude of the movement compensation vectors that the microprocessor provides to the variable length decoder, and the display information that the microprocessor provides to the display controller.

8. The motion picture decoder of claim 5, wherein the memory controller includes:

an instruction memory, independent of said memory bus, in which are stored program instructions corresponding respectively to transfer tasks on the memory bus;

an instruction processor that is connected to the instruction memory in order to receive therefrom successive instructions to be executed, and that is connected to act on said memory bus in response to these instructions;

a plurality of instruction pointers associated respectively to possible tasks, wherein each instruction pointer points to a next instruction to execute in a program associated to the respective task, and only one instruction pointer at a time is updated at the rate of instruction cycles for causing execution of the instructions it points at; and a priority decoder for selecting said only one instruction pointer when the priority level of the respective task becomes highest.

9. The motion picture decoder of claim 8, wherein each instruction includes a command field that is provided to the instruction processor and a feature field provided to a prefix decoder including:

means for authorizing the selection of a new instruction pointer by the priority decoder if the feature field of the current instruction is at a first predetermined value; and means for initializing the content of the selected instruction pointer to the start address of the current program if the feature field of the current instruction is at a second predetermined value.

10. The motion picture decoder of claim 9, wherein the prefix decoder includes means for inhibiting the incrementation of the selected instruction pointer if the feature field is at a third predetermined value, so that the current instruction is executed consecutively several times, the number of executions being determined by this third value.

11. The motion picture decoder of claim 8, wherein the instruction processor includes a plurality of function circuits for the calculation of addresses, each function circuits being selected by a field of a read or write instruction that is being executed.

12. The motion picture decoder of claim 11, wherein with each function circuit is associated an address register connected to the memory bus, wherein the function circuit suitably modifies the content of its address register each time an instruction is executed in the instruction processor.

13. The motion picture decoder of claim 8, wherein each instruction includes a command field provided to the instruction processor and an acknowledge field provided to means for, when the instruction is being executed, enabling at least one buffer memory connected to the memory bus.

* * * * *